US010725802B2

(12) United States Patent
Fitzgerald et al.

(10) Patent No.: US 10,725,802 B2
(45) Date of Patent: Jul. 28, 2020

(54) METHODS AND APPARATUS FOR USING TAGS TO CONTROL AND MANAGE ASSETS

(71) Applicant: ManageIQ, Inc., Raleigh, NC (US)

(72) Inventors: Joseph Fitzgerald, Franklin Lakes, NJ (US); Oleg Barenboim, Fort Lee, NJ (US); Gregg Tanzillo, Middletown, NY (US)

(73) Assignee: Red Hat, Inc., Raleigh, NC (US)

( * ) Notice: Subject to any disclaimer, the term of this patent is extended or adjusted under 35 U.S.C. 154(b) by 17 days.

(21) Appl. No.: 14/299,492

(22) Filed: Jun. 9, 2014

(65) Prior Publication Data

US 2014/0289730 A1 Sep. 25, 2014

Related U.S. Application Data

(63) Continuation of application No. 11/945,757, filed on Nov. 27, 2007, now Pat. No. 8,752,045, which is a (Continued)

(51) Int. Cl.
G06F 9/455 (2018.01)
G06F 9/50 (2006.01)
G06F 21/62 (2013.01)

(52) U.S. Cl.
CPC ............ *G06F 9/455* (2013.01); *G06F 9/5077* (2013.01); *G06F 21/6218* (2013.01)

(58) Field of Classification Search
CPC .................................................... G06F 9/455
(Continued)

(56) References Cited

U.S. PATENT DOCUMENTS 5,278,979 A 1/1994 Foster et al.
5,574,906 A 11/1996 Morris
(Continued)

FOREIGN PATENT DOCUMENTS

CA 2547630 6/2005
EP 1674965 6/2006
WO WO 2006036277 4/2005

OTHER PUBLICATIONS

Steinholtz et al., "Automatic Identification of Software System Differences", IEEE Trans. On Software Engineering, Apr. 1987, pp. 493-497, vol. SE-13, No. 4 [retrieved from internet on Nov. 14, 2012] <URL:http://ieeexplore.ieee.org/stamp/stamp.jsp?tp=&arnumber=1702241>.

(Continued)

Primary Examiner — Chat C Do
Assistant Examiner — Bradford F Wheaton
(74) Attorney, Agent, or Firm — K&L Gates LLP

(57) ABSTRACT

By implementing various types of tags, easy management and control of assets in a business system is enabled. These assets may be virtual machines, hardware assets, personnel assets, etc. System tags are determined and associated with an asset automatically. Virtual tags and dynamic tags are tags that do not contain the information sought—rather, these tags contain instructions about how to determine the tag value associated with an asset. Management tags are user-entered tags indicating information about an asset based on the knowledge of an individual. These tags can be combined using Boolean algebraic operators, resulting in a tag-based algebra system, which enables a Tag-Based Query Language for searching a universe of assets based on the associated tags. Additionally, tag-based algebra enables access control based on tags associated with a user, assets in (Continued)

a universe of assets, and enables policies to be enforced in a universe of assets.

20 Claims, 7 Drawing Sheets

Related U.S. Application Data continuation-in-part of application No. 11/550,368, filed on Oct. 17, 2006, now Pat. No. 8,612,971.

(58) Field of Classification Search
USPC .................................................. 718/1
See application file for complete search history.

(56) References Cited

U.S. PATENT DOCUMENTS

| | | | |
|---|---|---|---|
| 5,581,764 A | 12/1996 | Fitzgerald et al. | |
| 5,761,477 A | 6/1998 | Wahbe et al. | |
| 6,000,000 A | 12/1999 | Hawkins et al. | |
| 6,003,075 A | 12/1999 | Arendt et al. | |
| 6,080,207 A | 6/2000 | Kroening et al. | |
| 6,085,244 A | 7/2000 | Wookey | |
| 6,169,976 B1 | 1/2001 | Colosso | |
| 6,253,258 B1 | 6/2001 | Cohen | |
| 6,292,889 B1 | 9/2001 | Fitzgerald et al. | |
| 6,381,677 B1 | 4/2002 | Beardsley et al. | |
| 6,463,535 B1 | 10/2002 | Drews | |
| 6,591,418 B2 | 7/2003 | Bryan et al. | |
| 6,711,660 B1 | 3/2004 | Milne et al. | |
| 6,757,871 B1 | 6/2004 | Sato et al. | |
| 6,772,330 B2 | 8/2004 | Merkin | |
| 6,795,966 B1 | 9/2004 | Lim et al. | |
| 6,850,252 B1 | 2/2005 | Hoffberg | |
| 6,922,831 B1 | 7/2005 | Kroening et al. | |
| 6,993,746 B2 | 1/2006 | Hue | |
| 6,996,773 B2 * | 2/2006 | Friedman | G06F 17/2247 715/240 |
| 7,024,549 B1 | 4/2006 | Luu et al. | |
| 7,080,051 B1 | 7/2006 | Crawford | |
| 7,089,300 B1 | 8/2006 | Birse et al. | |
| 7,100,195 B1 | 8/2006 | Underwood | |
| 7,155,586 B1 * | 12/2006 | Wagner | G06F 11/1435 707/999.202 |
| 7,203,944 B1 | 4/2007 | Van Rietschote et al. | |
| 7,233,939 B1 | 6/2007 | Ziauddin | |
| 7,272,799 B2 | 9/2007 | Imada et al. | |
| 7,287,029 B1 * | 10/2007 | Craft | G06F 17/30997 |
| 7,313,793 B2 | 12/2007 | Traut et al. | |
| 7,356,679 B1 | 4/2008 | Le et al. | |
| 7,437,764 B1 | 10/2008 | Sobel et al. | |
| 7,496,757 B2 | 2/2009 | Abbott et al. | |
| 7,506,265 B1 | 3/2009 | Traut et al. | |
| 7,555,551 B1 | 6/2009 | McCorkendale et al. | |
| 7,567,984 B1 | 7/2009 | Todd | |
| 7,577,722 B1 | 8/2009 | Khandekar et al. | |
| 7,577,828 B2 | 8/2009 | Sammer et al. | |
| 7,584,195 B2 | 9/2009 | Johnson et al. | |
| 7,594,185 B2 | 9/2009 | Anderson et al. | |
| 7,657,871 B2 | 2/2010 | Velupillai | |
| 7,698,545 B1 | 4/2010 | Campbell et al. | |
| 7,802,084 B2 | 9/2010 | Fitzgerald et al. | |
| 7,802,247 B1 | 9/2010 | Weathersby et al. | |
| 7,827,528 B2 | 11/2010 | Sattler et al. | |
| 7,831,968 B1 | 11/2010 | Weathersby et al. | |
| 7,853,621 B2 * | 12/2010 | Guo | G06F 19/321 707/803 |
| 7,860,834 B2 | 12/2010 | Meller et al. | |
| 7,890,951 B2 | 2/2011 | Vinberg et al. | |
| 7,908,589 B2 | 3/2011 | Sattler et al. | |
| 7,912,800 B2 | 3/2011 | Sattler et al. | |
| 7,941,786 B2 | 5/2011 | Scott et al. | |
| 7,996,289 B2 | 8/2011 | Francis et al. | |
| 8,015,563 B2 | 9/2011 | Araujo, Jr. et al. | |
| 8,073,926 B2 | 12/2011 | Traut et al. | |
| 8,301,874 B1 | 10/2012 | Heidingsfeld et al. | |
| 2001/0044834 A1 | 11/2001 | Bradshaw et al. | |
| 2002/0073236 A1 | 6/2002 | Hegelson et al. | |
| 2002/0100017 A1 | 7/2002 | Grier et al. | |
| 2003/0009752 A1 | 1/2003 | Gupta | |
| 2003/0037181 A1 | 2/2003 | Freed | |
| 2003/0070087 A1 | 4/2003 | Gryaznov | |
| 2003/0177278 A1 | 9/2003 | DeNatale | |
| 2004/0031030 A1 | 2/2004 | Kidder et al. | |
| 2004/0073899 A1 | 4/2004 | Luk et al. | |
| 2004/0128664 A1 | 7/2004 | Johnson | |
| 2004/0128670 A1 | 7/2004 | Robinson et al. | |
| 2004/0172550 A1 | 9/2004 | Sai | |
| 2004/0193913 A1 | 9/2004 | Han et al. | |
| 2004/0204266 A1 | 10/2004 | Owens et al. | |
| 2004/0205101 A1 | 10/2004 | Radhakrishnan | |
| 2004/0210653 A1 | 10/2004 | Kanoor et al. | |
| 2004/0268347 A1 | 12/2004 | Knauerhase et al. | |
| 2005/0033970 A1 | 2/2005 | Anson et al. | |
| 2005/0080801 A1 | 4/2005 | Kothandaraman et al. | |
| 2005/0086268 A1 * | 4/2005 | Rogers | 707/200 |
| 2005/0125513 A1 | 6/2005 | Lam et al. | |
| 2005/0138542 A1 * | 6/2005 | Roe | G06F 8/427 715/237 |
| 2005/0246436 A1 | 11/2005 | Day et al. | |
| 2005/0262101 A1 | 11/2005 | Halpern et al. | |
| 2005/0283640 A1 | 12/2005 | Cheston et al. | |
| 2005/0289542 A1 | 12/2005 | Uhlig et al. | |
| 2006/0004667 A1 | 1/2006 | Neil | |
| 2006/0010433 A1 * | 1/2006 | Neil | G06F 9/45533 717/138 |
| 2006/0010440 A1 | 1/2006 | Anderson et al. | |
| 2006/0025985 A1 | 1/2006 | Vinberg et al. | |
| 2006/0026219 A1 | 2/2006 | Orenstein et al. | |
| 2006/0036570 A1 | 2/2006 | Schaefer et al. | |
| 2006/0059253 A1 | 3/2006 | Goodman et al. | |
| 2006/0074876 A1 * | 4/2006 | Kakivaya et al. | 707/3 |
| 2006/0075252 A1 | 4/2006 | Kallahalla et al. | |
| 2006/0075487 A1 | 4/2006 | Pfleging et al. | |
| 2006/0136720 A1 | 6/2006 | Armstrong et al. | |
| 2006/0136910 A1 | 6/2006 | Brickell et al. | |
| 2006/0136911 A1 | 6/2006 | Robinson et al. | |
| 2006/0155735 A1 | 7/2006 | Traut et al. | |
| 2006/0179476 A1 | 8/2006 | Challener et al. | |
| 2006/0184935 A1 | 8/2006 | Abels et al. | |
| 2006/0184937 A1 | 8/2006 | Abels et al. | |
| 2006/0206900 A1 | 9/2006 | Ooyama et al. | |
| 2006/0218536 A1 | 9/2006 | Kirilline et al. | |
| 2006/0218544 A1 * | 9/2006 | Chakraborty et al. | 717/168 |
| 2006/0225065 A1 | 10/2006 | Chandhok et al. | |
| 2006/0274060 A1 | 12/2006 | Ni et al. | |
| 2006/0294421 A1 | 12/2006 | Schneider | |
| 2007/0016893 A1 * | 1/2007 | Branda et al. | 717/127 |
| 2007/0028238 A1 | 2/2007 | Bennett et al. | |
| 2007/0043860 A1 | 2/2007 | Pabari | |
| 2007/0050409 A1 | 3/2007 | Bugir | |
| 2007/0050842 A1 | 3/2007 | Smith et al. | |
| 2007/0083610 A1 | 4/2007 | Treder et al. | |
| 2007/0083655 A1 | 4/2007 | Pedersen | |
| 2007/0130232 A1 | 6/2007 | Therrien et al. | |
| 2007/0136807 A1 | 6/2007 | DeLiberato et al. | |
| 2007/0169121 A1 | 7/2007 | Hunt et al. | |
| 2007/0179987 A1 | 8/2007 | Lim | |
| 2007/0180450 A1 | 8/2007 | Croft et al. | |
| 2007/0180493 A1 | 8/2007 | Croft et al. | |
| 2007/0192329 A1 | 8/2007 | Croft et al. | |
| 2007/0198612 A1 | 8/2007 | Prahlad et al. | |
| 2007/0198656 A1 | 8/2007 | Mazzaferri et al. | |
| 2007/0204266 A1 | 8/2007 | Beaty et al. | |
| 2007/0208685 A1 | 9/2007 | Blumenau | |
| 2007/0214408 A1 * | 9/2007 | Straub et al. | 715/513 |
| 2007/0230504 A1 | 10/2007 | Smith et al. | |
| 2007/0234356 A1 | 10/2007 | Martins et al. | |
| 2007/0250833 A1 | 10/2007 | Araujo, Jr. et al. | |
| 2007/0288228 A1 | 12/2007 | Taillefer et al. | |
| 2008/0016187 A1 * | 1/2008 | Neil et al. | 709/220 |

(56) References Cited

U.S. PATENT DOCUMENTS

2008/0126439 A1 5/2008 Kaminsky
2008/0301770 A1 12/2008 Kinder
2010/0070970 A1 3/2010 Hu et al.

OTHER PUBLICATIONS

Sirer, E.G. et al., "Design and Implementation of a Distributed Virtual Machine for Networked Computers," SOSP-17, ACM, Dec. 1999, pp. 202-216.
Martinez, P. et al., "Using the Script MIB for Policy-Based Configuration Management," 16 pages, 2002.
"Microsoft Windows XP: Using Software Restriction Policies to Protect Against Unauthorized Software," Microsoft TechNet, Jan. 1, 2002, 28 pages.
Traugott, S. et al. "Why Order Matters: Turing Equivalence in Automated Systems Adminstration," USENIX Large Installation System Administration Conference, Nov. 3-8, 2002, pp. 1-35.
Williams, M.A., "Anti-Trojan and Trojan Detection with In-Kernel Digital Signature Testing of Executables," NetXSecure NX Limited, pp. 1-12, Apr. 16, 2002.
Doser, J., "Using SecureUML to Secure Controllers," Albert-Ludwigs-Unversitat Freiburg. 28 pages, 2003.
Doser, J., "Generating Access Control Infrastructures from SecureUML Models," Albert-Ludwigs-Unversitat Freiburg, 24 pages, 2003.
Garfinkel, T. et al., "Terra: A Virtual Machine-Based Platform for Trusted Computing," SOSP '03, ACM, Oct. 19-22, 2003, pp. 193-206.
"MSN Reduces New Server Build and Deploy Time by 98 Percent," Microsoft Corporation, Sep. 2003, 6 pages.
Apvrille, A. et al., "DigSig: Run-Time Authentication of Binaries at Kernel Level," 2004 LISA XVIII, Nov. 14-19, 2004, pp. 59-66.
Bakos, G., "Honeypots and the Enterprise: Intelligence-based Risk Management," Institute for Security Technology Studies, Dartmouth College, 98 pages, 2004.
"EFI Framework FAQs," American Megatrends, Inc., 2004, 4 pages.
Haldar, V. et al., "Semantic Remote Attestation—A Virtual Machine Directed Approach to Trusted Computing," Proceedings of the Third Virtual Machine Research and Technology Symposium, USENIX Association, San Jose, CA, May 6-7, 2004, 14 pages.
Kim.H. et al., "Autograph: Toward Automated, Distributed Worm Signature Detection," 16 pages, 2004.
Krsul, I. et al., "VMPLants: Providing and Managing Virtual Machine Execution Environments for Grid Computing," IEEE, 2004, pp. 1-12.
Sufatrio et al., "A Machine-Oriented Integrated Vulnerability Database for Automated Vulnerability Detection and Processing," 2004 LISA XVIII, Nov. 14-19, 2004, pp. 47-58.
Verdon, D. et al. "Risk Analysis in Software Design," IEEE Security & Privacy, 2004, pp. 32-37.
Wang, Y-M, et al., "Detecting Stealth Software with Strider GhostBuster," Dec. 13, 2004, Technical Report MSR-TR-2005-25, Microsoft Corporation, 11 pages.
Wang, Y-M, et al. Gatekeeper: Monitoring Auto-Start Extensibility Points (ASEPs) for Spyware Management, 2004 LISA XVIII, Nov. 14-19, 2004, pp. 33-46.
Whitaker, A. et al., "Using Time Travel to Diagnose Computer Problems," 6 pages, 2004.
Banerjee, S.et al., "Scalable Grid Service Discovery Based on UDDI," MGC '05, Nov. 28-Dec. 2, 2005, ACM, 6 pages.
"Cache-Based System Management Architecture with Virtual Appliances, Network Repository and Virtual Appliance Transceivers," Jun. 9, 2005, 23 pages.
Calder, B. et al., "The Entropia Virtual Machine for Desktop Grids," VEE'05, ACM, Jun. 11-12, 2005, pp. 1-11.
Casper, B., "Using Network Appliance Snapshot Technology with VMware® ESX Server," Network Appliance, Inc., 2005, 14 pages.
Chen, Y., "Service-Oriented Computing: Architecture, Programming, and Applications," The Ninth TASTED International Conference on Software Engineering and Applications, Nov. 14-16, 2005, 40 pages.
Garfinkel, T. et al., "When Virtual is Harder Than Real: Security Challenges in Virtual Machine Based Computing Environments," 6 pages, 2005.
Goldfein, J., "PAC095 Workstation 5 and Beyond: What's New," VMworld 2005, Virtualize Now, 2005, 30 pages.
"JPI Version 7i Desktop Management," Hitachi Asia Ltd., 2005 4 pages.
Keahey, K., "Working Spaces: Virtual Machines in the Grid," Globus World 2005, Feb. 10, 2005, 23 pages.
Kieffer, M., "Windows Virtualization Architecture," Microsoft Corporation, 2005, 23 pages.
"Managing Configurations and Compliance with Oracle Enterprise Manager 10g," An OracleWhite Paper, Oracle, Sep. 2005, 9 pages.
Naik, V.K. et al., "Configuring, Deploying, and Managing Virtual Grid Environments," pp. 1-5, 2005.
Newsome, J. et al., "Polygraph: Automatically Generating Signatures for Polymorphic Worms," 16 pages, 2005.
Newsome, J. et al., "Polygraph: Automatically Generating Signatures for Polymorphic Worms," May 2005, 46 pages.
Stewart, V., "Network Appliance & VMware ESX Server: Instantaneous Backup & Recovery with NetApp Snapshot Technology," Oct. 2005, 15 pages.
TRIUMF/HEPnet Lightpath Object Composition GUI, Canarie, 14 pages, 2005.
"VMware ACE, Product Datasheet," VMware, Inc., 2005, 2 pages. VMworld2005 Virtualize Now, VMware Education Services Course, Las Vegas, Oct. 18-20, 2005, 10 pages.
Waldspurger, C., "PAC485 Managing Datacenter Resources Using the 108 VirtualCenter Distributed Resource Scheduler," VMWorld 2005, VMware, Inc., 2005, 36 pages.
Zhao, X. et al., "SVGrid: A SecureVirtual Environment for Untrusted Grid Applications," pp. 1-8, 2005.
Bloehdorn, S. et al., "TagrFS—Tag Semantics for Hierarchical File Systems," In Proceedings of the 6th International Conference on Knowledge Management (I-KNOW 06), Graz, Austria, Sep. 2-6, 2006, 8 pages, [online] Retrieved from the Internet http//semfs.ontoware.org/pubs/2006-2009-iknow2006-tagfs.pdf.
"Configuration Management," Hewlett-Packard Development Company, L.P., 2006 [online] [Retrieved on Dec. 15, 2006] Retrieved from the Internet http://openview.hp.com/solutions/ascm/Index.html.
"Configuration Management Solutions for Desktops," Hewlett-Packard Development Company, L.P., 2006, [online] [Retrieved on Dec. 15, 2006] Retrieved from the Internet http://openview.hp.com/products/radia_mdsk/index. html.
"Configuration Management Solutions for Servers," Hewlett-Packard Development Company, LP., 2006, [online] [Retrieved on Dec. 15, 2006] Retrieved from the Internet http://openview.hp.com/products/radia_msvr/index. html>.
Dharanikota et al., "Manageable Dynamic Execution Environments on the Grid Using Virtual Machines", Parallel Processing and Applied Mathematics Lecture Notes in Computer Science, Jan. 2006, pp. 643.
Keahey, K. et al., "Virtual Infrastructure in the Grid," Jan. 30, 2006, 19 pages.
Keahey, K. et al., "Virtual Workspaces Achieving Quality of Service and Quality of Life in the Grid," 12 pages, 2005.
King, S.T. et al., "SubVirt: Implementing Malware with Virtual Machines," 14 pages, 2006.
Laverick, M., "VMware ESX 2.1/5 Server Administration II, Documents Version 1.3" RTFM Education, 117 pages, 2006.
Lemos, R., "Your Own Personal Matrix," PC Magazine, Oct. 17, 2006, 1 page.
Lin, B. et al., Towards an Understanding of Decision Complexity in IT Configuration,: IBM Corporation, 2006, 16 pages.
MacFarland, A. "PlateSpin Builds Flexibility into a clone-Based Data Center Lifestyle," The Clipper Group Navigator, Feb. 8, 2006, pp. 1-4.

(56) References Cited

OTHER PUBLICATIONS

Mohan, P. et al., "Semantic File Retrieval in File Systems Using Virtual Directories," 4 pages, 2006, [online] Retrieved from the Internet http://www.hipc.org/hipc2006/posters/semfs.pdf.
Potnis, N., "Debugging OS's with Time Traveling Virtual Machines," University of Michigan, 26 pages, 2006.
Reinhardt, M., "Energy-Aware Scheduling of Virtual Machines in a Multiprocessor Environment," Universitat Karlsruhe, Jun. 13, 2006, 86 pages.
St. Arnaud, B., "Service Oriented Architectures for R&E Networks Google Mashing Everything," CANARIE, Inc., 18 pages, 2006.
Schenk, S. et al., TagFS: Bringing Semantic Metadata to the Filesystem, Institute for Computer Science, University of Koblenz, 2 pages, [online] Retrieved from the Internet http://eswc2006org/poster.papers/FP31-Schenk.pdf.
Schenk, S. et al. "TagFS—TagSemantics for Hierarchical File Systems," 2006, University of Koblenz Landau Germany, 31 pages, [online] Retrieved from the Internet http://i-know.know-center.tugraz.at/content/download/734/2960/file/vol kel. pdf.
"Unicenter CA—Teleview Session Management, Enterprise Systems Management," ca, 2006, [online] [Retrieved on Dec. 15, 2006] Retrieved from the Internet http://www3.ca.com/solutions/Product.aspx?ID=1525.
"VMTM—Virtual Appliances: How to Build a Virtual Appliance,": VMware, Inc., 2006, 9 pages.
Dig et al., "Refactoring-aware Configuration Management for Object-Oriented Programs", 29$^{th}$ Intl. Conference on Software Engineering, IEEE, 2007, pp. 1-10 [retrieved from internet on Nov. 14, 2012] <URL:http://dl.acm.org/citation.cfm?id=1248820>.
Ganguly et al., "Reducing Comlexity of Software Deployment with Delta Configuration", IEEE, 2007, pp. 729-732 [retrieved from internet on Aug. 3, 2011] <URL:http://ieeexplore.ieee.org/xpls/abs_all.jsp?anumber=4258590.
Lu, W. et al., "Making Your Workspace Secure: Establishing Trust with VMs in the Grid," 10 pages, 2007.
International Search Report and Written Opinion of the International Searching Authority for International Application No. PCT/US08/84834, dated Jan. 13, 2009.
International Search Report and Written Opinion of the International Searching Authority for International Application No. PCT/U508/84844 dated Jan. 16, 2009.
International Search Report and Written Opinion of the International Searching Authority for International Application No. PCT/US08/84829, dated Jan. 22, 2009.
International Search Report and Written Opinion of the International Searching Authority for International Application No. PCT/U508/84860 dated Jan. 23, 2009.
International Search Report and Written Opinion of the International Searching Authority for International Application No. PCT/US08/84853, dated Jan. 28, 2009.
Written Opinion of the International Searching Authority for International Application No. PCT/US07/81652 dated Apr. 23, 2008.
Written Opinion of the International Searching Authority for International Application No. PCT/U507/81646 dated May 5, 2008.
Written Opinion of the International Searching Authority for International Application No. PCT/US07/81636 dated Jun. 3, 2008.
Written Opinion of the International Searching Authority for International Application No. PCT/US07/81647 dated Jun. 3, 2008.
Written Opinion of the International Searching Authority for International Application No. PCT/US07/81644 dated Jun. 17, 2008.
Written Opinion of the International Searching Authority for International Application No. PCT/US08/84849 dated Jan. 12, 2009.
Written Opinion of the International Searching Authority for International Application No. PCT/U508/84823 dated Jan. 22, 2009.
Wang et al., "Rethink the Virtual Machine Template", VEE'11, Mar. 9-11, 2011, pp. 39-69 <URL:http://dl.acm.org/citation.cfm?id=1952682>.
Halle et al., "ValidMaker: A Tool for Managing Device Configurations Using Logical Constraints", IEEE, 2012, pp. 1111-1118 [retrieved from internet on 22-14-12] <URL:http://ieeexplore.ieee.org/stamp/stamp.jsp?tp=&arnumber=6212037>.
European Search Report dated Dec. 18, 2012 for corresponding European Appln. No. 12171750.8.

\* cited by examiner

Fig. 1
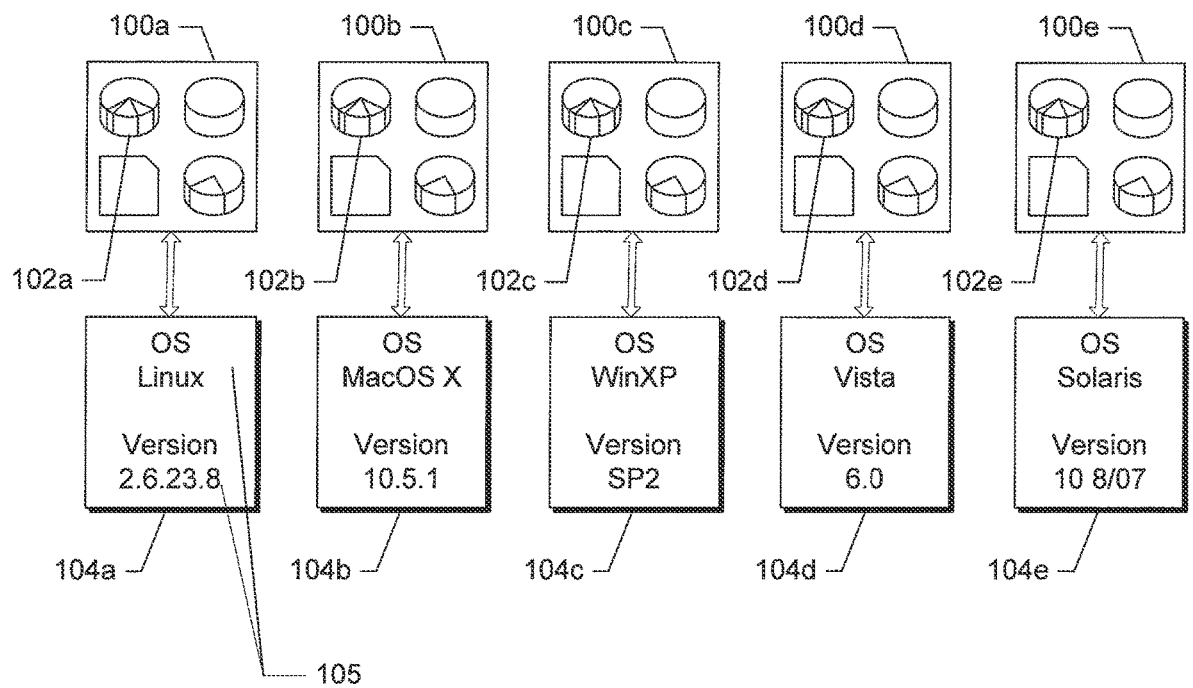
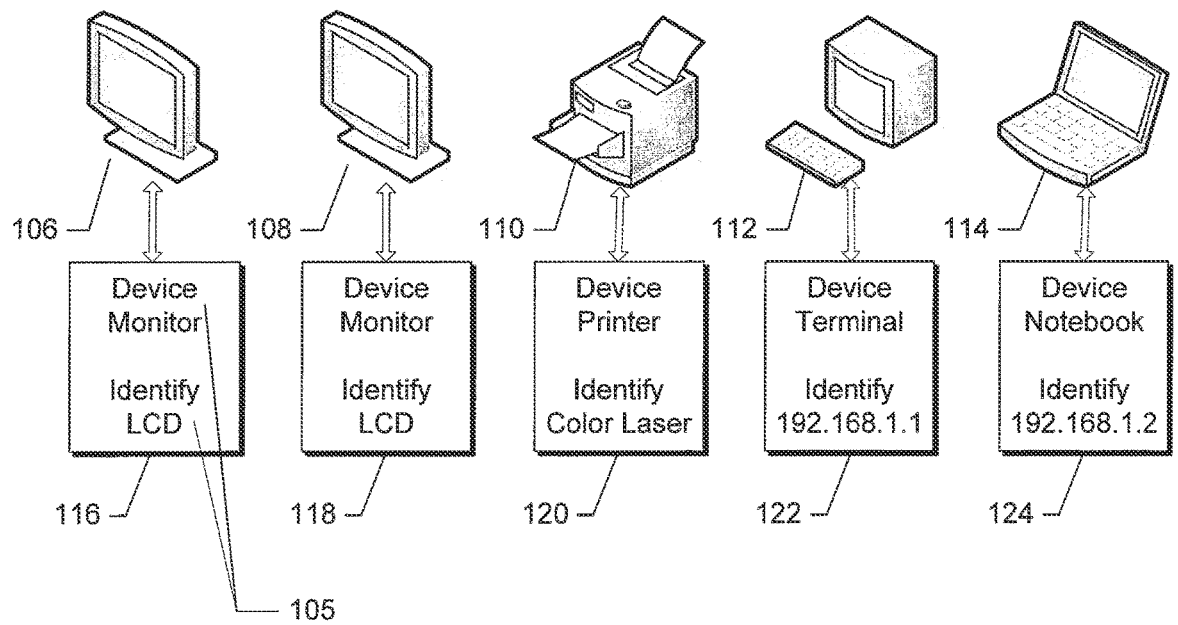

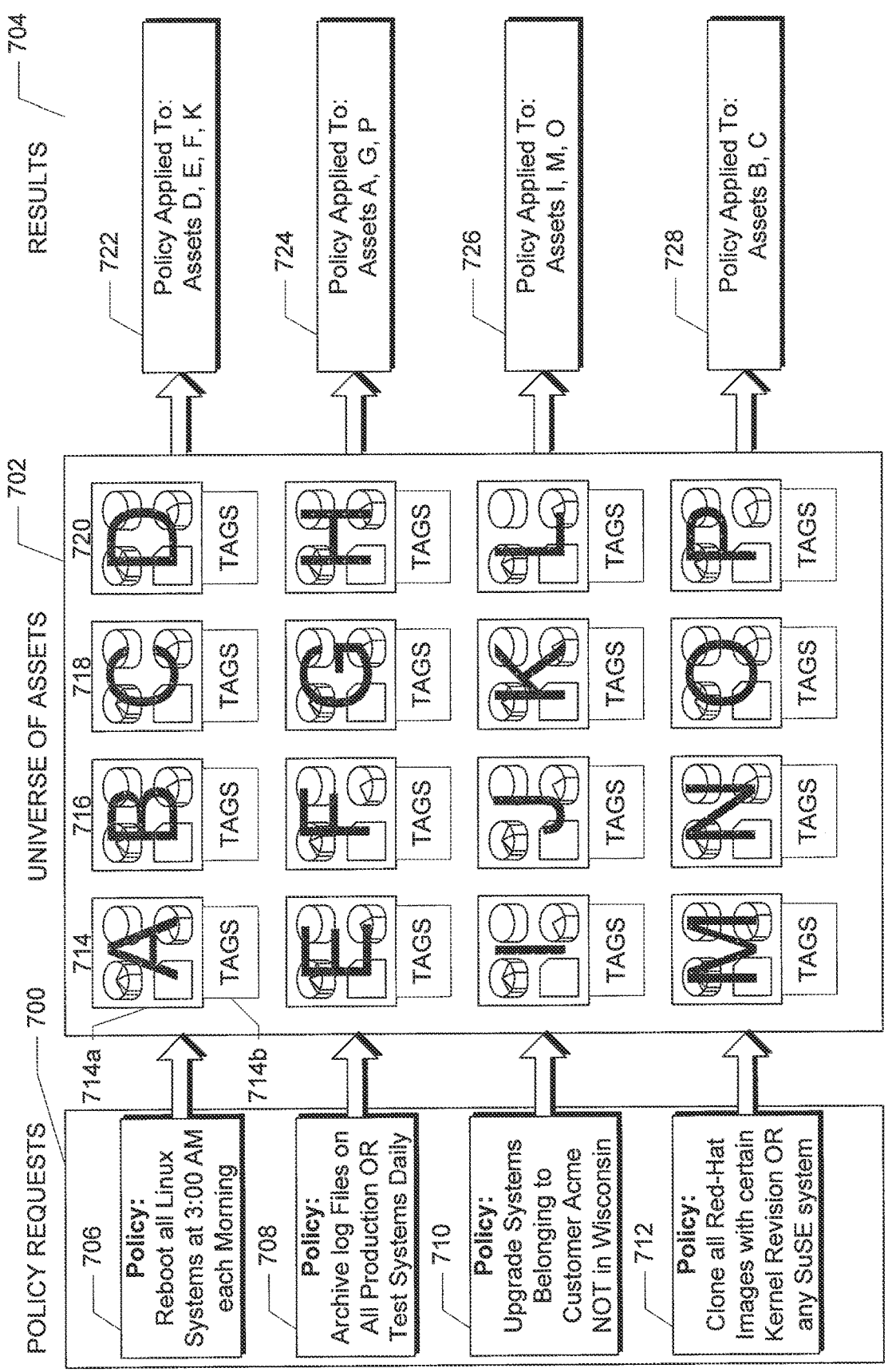

METHODS AND APPARATUS FOR USING TAGS TO CONTROL AND MANAGE ASSETS

PRIORITY CLAIM AND CROSS-REFERENCE TO RELATED APPLICATION

The present application is a continuation of and claims priority to U.S. application Ser. No. 11/945,757, filed on Nov. 27, 2007, which is a continuation-in-part of and claims priority to U.S. patent application Ser. No. 11/550,368, filed on Oct. 17, 2006, the entire contents of which are incorporated herein.

This application is related to U.S. application Ser. No. 11/550,348, filed Oct. 17, 2006, titled "Control and Management of Virtual Systems". In addition, this application is related to U.S. application Ser. No. 11/550,356, filed Oct. 17, 2006, titled "Registering and Accessing Virtual Systems for Use in a Managed System". In addition, this application is related to U.S. application Ser. No. 11/550,364, filed Oct. 17, 2006, titled "Enforcement of Compliance Policies in Managed Virtual Systems". In addition, this application is related to U.S. application Ser. No. 11/550,362, filed Oct. 17, 2006, titled "Compliance-Based Adaptations in Managed Virtual Systems". In addition, this application is related to U.S. application Ser. No. 11/945,945, filed Nov. 27, 2007, titled "Control and Management of Virtual Systems". In addition, this application is related to U.S. application Ser. No. 11/945,923, filed Nov. 27, 2007, titled "Registering and Accessing Virtual Systems for Use in a Managed System". In addition, this application is related to U.S. application Ser. No. 11/945,927, filed Nov. 27, 2007, titled "Enforcement of Compliance Policies in Managed Virtual Systems". In addition, this application is related to U.S. application Ser. No. 11/945,935, filed Nov. 27, 2007, titled "Compliance-Based Adaptations in Managed Virtual Systems". In addition, this application is related to U.S. application Ser. No. 11/945,941, filed Nov. 27, 2007, titled "Automatic Optimization for Virtual Systems". Each of these applications is herein incorporated in its entirety by reference.

TECHNICAL FIELD

The present application relates in general to virtual machines and other business assets and more specifically to methods and apparatus of assigning tags to virtual machines and other business assets.

BACKGROUND

Virtual machines are becoming increasingly prevalent solutions for users who want the appearance of a dedicated physical machine but who do not need the processing power of a dedicated physical machine. Operators who provide virtual machines to these users frequently manage dozens, and sometimes hundreds, of virtual machines running on only a few physical host machines. As a result, virtual machine environments are complex, and change frequently. Moreover, it is preferable for virtual machines to be compatible with various physical host machine environments, so that operators can migrate and upgrade hardware as necessary, while providing a consistent and reliable set of virtual machines to the users. It is a challenge for virtual machine developers and operators to effectively and efficiently manage the dozens and sometimes hundreds of virtual machines simultaneously, particularly if many of the virtual machines appear identical at a quick glance. It is therefore desirable to provide a method and apparatus for quickly and easily identifying an individual virtual machine among a large number of similar virtual machines. It is also desirable to provide a method and apparatus for quickly and easily determining certain characteristics of each individual virtual machine. Because a virtual machine is not a physical item, efficiently locating a particular machine is often difficult.

Many websites, such as gmail.com, delicious.com, flickr.com, and digg.com, allow users to associate tags with ranges of memory locations to enable easy identification and searching. For example, flickr.com allows users to upload digital photos taken on individual digital cameras. Because computer software is substantially unable to distinguish images contained in the photos, it is difficult for flickr.com users to search the vast database of digital photographs uploaded by members of the flickr.com community. As a result, flickr.com and other sites like it allow users to associate tags with each digital photo. For example, a user might upload photographs of a family gathering, and associate the tags "reunion," "mom," "dad," "grandfather," and "summer" with each photo. Future users are then able to easily search an entire database of tagged images and quickly find images based on their content, according to the user-assigned tags. Tagging provides the notable advantage of a one-to-all relationship—there is no need for predefined tagging categories. Rather, a user can tag items freeform, so to speak, constrained only by the language in which the tags are written. In some tagging systems, such as a system to tag email, certain predefined categories may exist. For example, email may be constrained to being tagged as junk, spam, or legitimate. One substantial shortcoming of this tagging system is that individual users must ensure that the tags are present and relevant—without substantial user input, the tagging system of flickr.com and other sites like it breaks down. Thus, in system-critical environments, tagging carries with it great risk, in that if a user makes a mistake or simply forgets to associate the proper tags, one or more objects for which a search is performed may not be located and a critical task may fail to be executed. Worse yet, the search may yield an incorrect object and the critical task may be executed in the wrong context.

BRIEF DESCRIPTION OF THE FIGURES

FIG. 1 is an example illustration of how system tags are associated with virtual machines and other hardware assets.

FIG. 7 is an illustration of an implementation of tag-based policies enabled by a Tag-Based Query Language (TQL).

DETAILED DESCRIPTION OF EXAMPLE EMBODIMENTS

Figure 2:
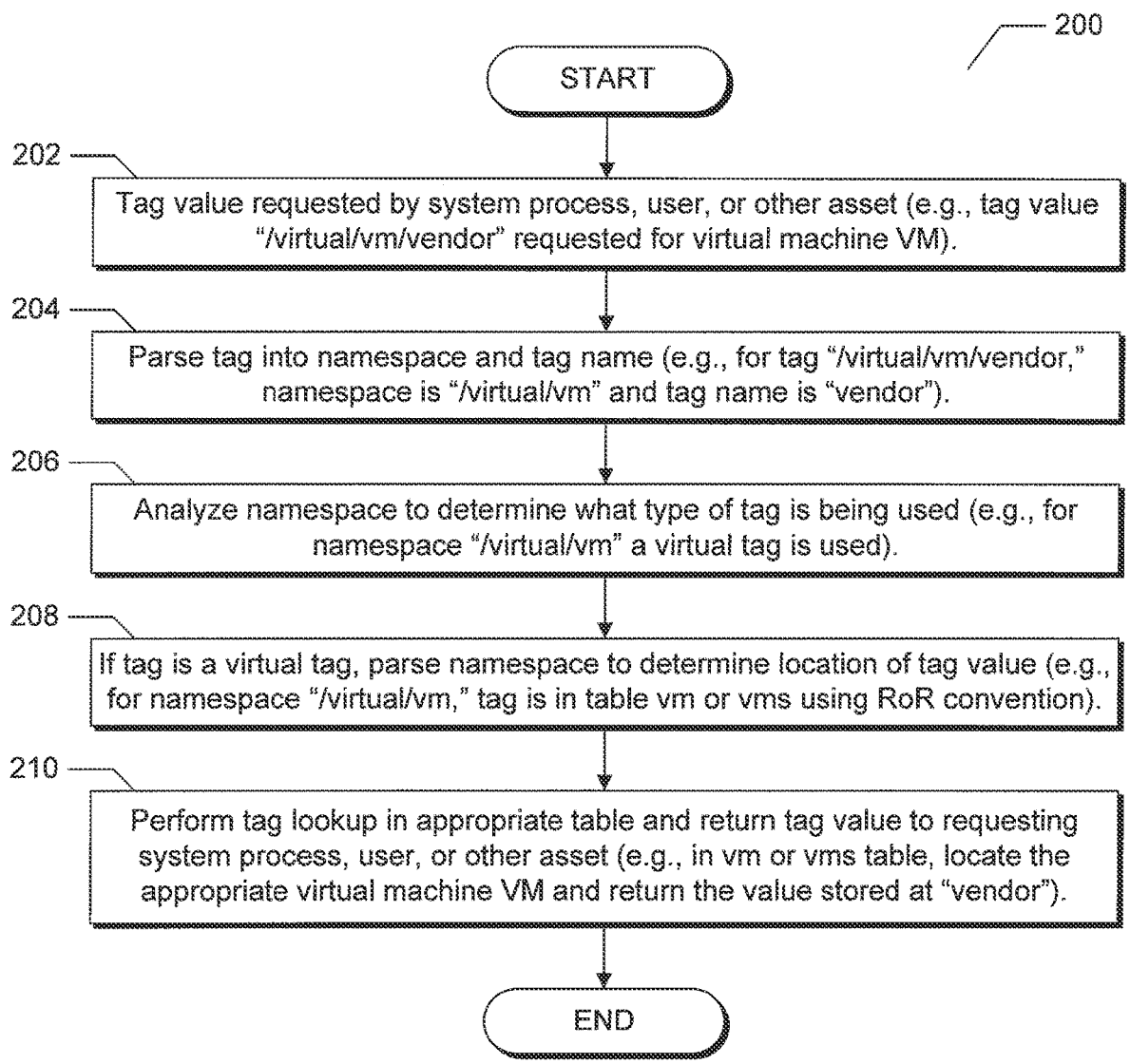
FIG. 2 is a flow chart explaining how a virtual tag is resolved to determine the tag value associated with a particular asset.

FIG. 1 is one example illustration of an implementation of system tags used in a universe of assets containing virtual machines and other hardware assets. In one example embodiment, a plurality of virtual machines 100 each has at least one virtual disk drive 102. Each virtual disk drive contains a plurality of information, including an operating system. The operating system may be one of Windows XP, Windows Vista, Mac OS X, Solaris, Linux, or any other suitable operating system. Each virtual machine 100 also has a database record 104 associated with it. Database records 104 include or are associated with a plurality of system tags 105 containing various generated, derived or manually entered information indicating properties of the virtual machine 100 with which the database record 104 is associated. In one example embodiment, the information contained in the system tags 105 in database record 104 is automatically generated by the system, and the automatically generated information includes the name and version of the operating system running on the virtual machine 100. Though in alternative embodiments this information may be entered by a user or system administrator, it is preferable that the information be generated automatically whenever possible. In one example embodiment, this tag information may be subsequently altered by a user or system administrator (i.e. it may be edited, created deleted, updated, or replaced) if the system is configured to allow this.

In another embodiment, each database record 104 contains or is associated with additional tags with additional information about the virtual machine 100, including the location, the installation date, the functionality or purpose of the virtual machine, the individual charged with maintaining the virtual machine, and/or any other suitable information. Because the tags are system tags, it should be appreciated that the system automatically updates these tags and that an administrator or other user may be allowed to edit them, if the system allows it.

FIG. 1 further illustrates that physical devices may have database records containing system tags associated with them. Devices 106 and 108 are associated with database records 116 and 118, which include or are associated with tags relating to devices 106 and 108. Database records 116 and 118 contain or are associated with system tags describing devices 106 and 108 as monitors, and further identifying them as Liquid Crystal Display (LCD) monitors. Similarly, device 110 is associated with database record 120, which includes or is associated with system tags identifying device 110 as a printer. Database record 120 contains or is associated with further system tags identifying device 110 as a color laser printer. Device 112 is associated with database record 122, which contains or is associated with system tags indicating that device 112 is a terminal. Additional system tags in or associated with database record 122 indicate that the IP address of device 112 is 192.168.1.1. Finally, device 114 is associated with database record 124. Database record 124 contains or is associated with tags identifying device 114 as a notebook computer, and identifying the IP address of device 114 as 192.168.1.2. In one embodiment, devices 106, 108, 110, 112, and 114 are any physical asset an operator desires to manage or control in database form. It will be appreciated that database records 116, 118, 120, 122, and 124 may contain or be associated with a plurality of system tags, including a plurality of information about the device with which the record is associated. In addition to the information disclosed above, the system tags in different embodiments may also include physical location, or any other discoverable information.

In other embodiments, the assets with which system tags are associated are not limited to computer hardware—for example, other entities in a management system, such as users, roles, policies, events, memberships, and other relationships, may have system tags associated with them. In further alternate embodiments, any type of business asset may have system tags associated with it. It should be appreciated that system tags may be associated with any asset for which the information contained in the system tag can be automatically generated and populated.

In an alternative embodiment, the universe of virtual machines 100 and other hardware assets 106, 108, 110, 112, and 114 is associated with an SQL database table, the SQL database table having two columns. The first column contains a tag name and the second contains a tag ID. In this example embodiment, the SQL database maintains a tagging table that contains a list of the relationships between any asset in the universe of assets and a tag. The tagging table contains an object type (e.g. User, VM, Host, Policy, etc.), an object ID (e.g. a specific instance of the object type), a tag id, and its own tagging ID.

In the example embodiment illustrated in FIG. 1, the system tags associated with a plurality of virtual machines 100 and hardware assets 106, 108, 110, 112, and 114 are automatically (based on some default, implicit, or explicit policies) rescanned and updated. In one example embodiment, the database records 104 and 116, 118, 120, 122, and 124 are changed to contain the proper system tags 105. In another example embodiment, an SQL database associated via a tagging table or other mechanism with the universe of assets is updated in response to certain events, such as timer expiration, user input, virtual machine events (e.g. start, stop, pause, resume, migrate, clone, template, deploy from template, create, or delete), host events, network events, storage events, thresholds reached (memory, CPU, network, storage) or many other system events or business events that trigger system events. In one embodiment, database records 104 contain or are associated with only the name and version of the operating system running on the virtual machine 100.

FIG. 2 is a flow chart of an example process 200 for resolving a virtual tag associated with a virtual machine 100. Although the example process 200 for resolving a virtual tag associated with a virtual machine 100 is described with reference to the flow chart illustrated in FIG. 2, it will be appreciated that many other methods of performing the acts of resolving a virtual tag are contemplated. For example, the order of many of the blocks may be changed, and many of the blocks described are optional.

The example process for resolving a virtual tag begins when a system process, user, or other asset requests a tag value (block 202). For example, a process requests the value associated with tag "/virtual/vm/vendor" for virtual machine VM. Next, the system parses the full tag to determine the namespace and the tag name (block 204). For example, for a tag value "/virtual/vm/vendor" associated with virtual machine VM, the namespace is parsed out to be "/virtual/vm" and the tag is parsed to be "vendor." Next, the system analyzes the parsed namespace to determine what type of tag is present (block 206). For example, from the namespace "/virtual/vm," the system determines that the tag is a virtual tag and from the tag name "vendor" determines that the virtual tag "vendor" is sought. Given that the tag is a virtual tag, the system next analyzes the location of the value of the tag by further parsing the namespace (block 208). For example, from namespace "/virtual/vm" the system determines the location of the tag value sought. In one example embodiment, using the Ruby on Rails convention (whereby an instance of a class is represented in a database by a table with the same name as the class or a table with the name of the class pluralized), the tag value sought is in table vms. In other example embodiments, the location of the tag value sought is determined from the tag namespace based on different conventions or based on custom-defined algorithms. Finally, the system performs a lookup in the proper database by locating the proper table, locating the asset with which the tag is associated within the proper table, performing a lookup for the parsed tag value, and providing the retrieved value to the requestor (block 210). For example, for tag "/virtual/vm/vendor" associated with virtual machine VM, the system locates table vm or vms (according to the Ruby on Rails convention) in the currently operative database, locates virtual machine VM within that table, retrieves the value stored in the vendor attribute of the table, and returns that value to the process that requested the tag value for virtual machine VM. It should be appreciated that although the example described above explains one example of virtual tags associated with virtual machines, alternative embodiments enable virtual tags to be applied to any suitable asset. Moreover, it should be appreciated that although the example described above refers to tables in a single database defined by the Ruby on Rails convention, it should be appreciated that any suitable implementation of a storage-and-lookup solution is contemplated. For example, a separate database could be associated with each asset as opposed to a single database containing information about all the assets. In another example embodiment, the tags for each VM are stored in a Systems Management Partition, in a datastore (e.g. metakit or Sqlite), as one or more text files (e.g. XML format), or in any other suitable storage and lookup format. It should be appreciated that no value is associated with a virtual tag until the virtual tag is parsed and resolved. Unlike system tags, which are stored as tag values associated with an asset, virtual tags contain instructions for obtaining a particular tag value for a particular asset, thus enabling "late binding" or just-in-time computation of tag values.

Figure 3:
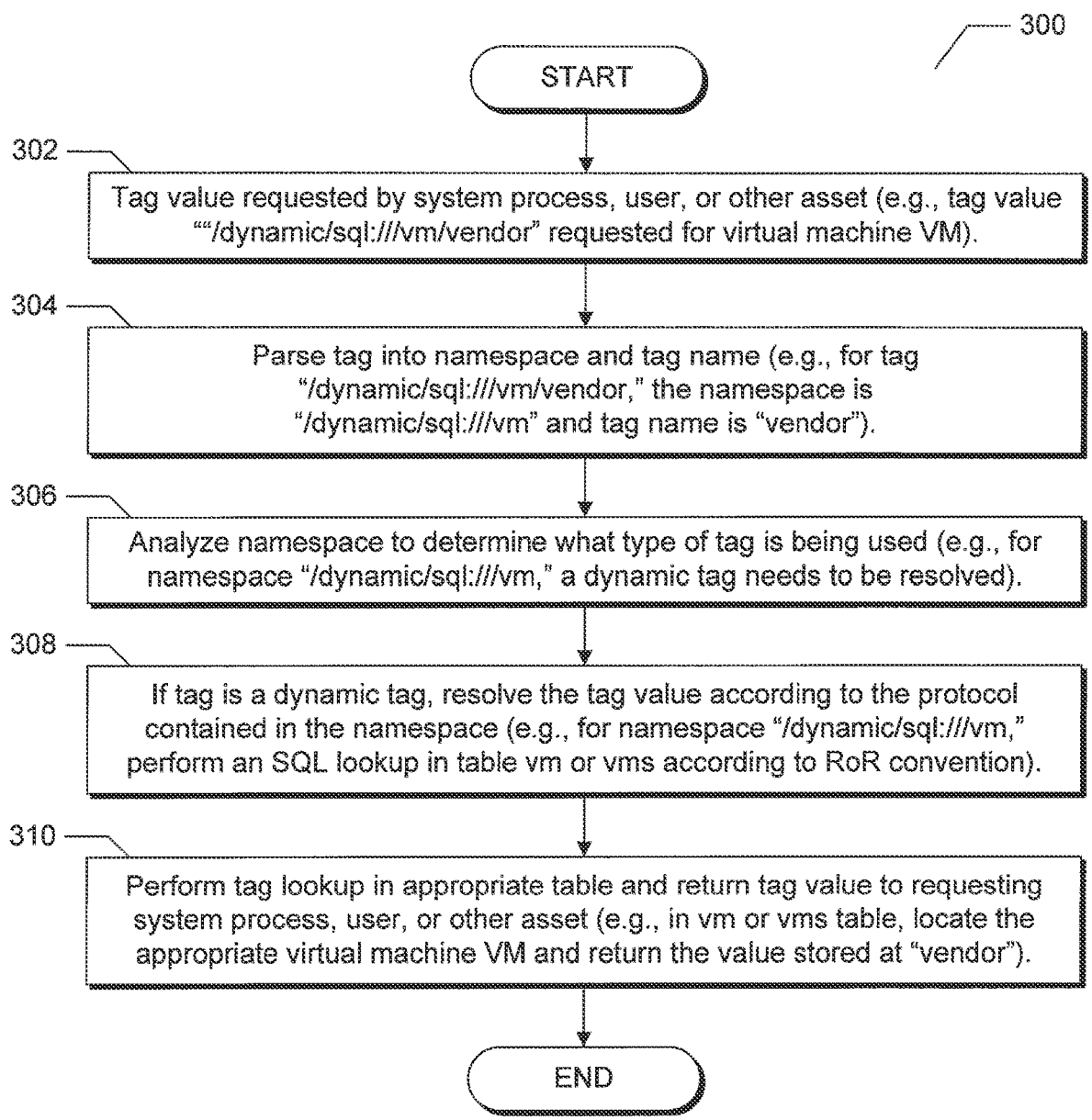
FIG. 3 is a flow chart explaining how a dynamic tag is resolved to determine the tag value associated with a particular asset.

FIG. 3 is a flow chart of an example process 300 for resolving a dynamic tag associated with a virtual machine 100. Although the example process 300 for resolving a dynamic tag associated with a virtual machine 100 is described with reference to the flow chart illustrated in FIG. 3, it will be appreciated that many other methods of performing the acts of resolving a virtual tag are contemplated. For example, the order of many of the blocks may be changed, and many of the blocks described are optional.

Dynamic tags are implemented as a superset of virtual tags, so the flow chart of FIG. 3 is similar to the flow chart of FIG. 2. The example process for resolving a dynamic tag begins when a system process, user, or other asset requests a tag value (block 302). For example, a process requests the value associated with the tag "/dynamic/sql:///vm/vendor." In an alternative embodiment, the value requested is associated with the tag "/dynamic/sql://sql.company.com?userid=admin+password=secret+dbname=production/vm/vendor." In alternative embodiments, any suitable Uniform Resource Identifier (URI) resolvable by the system may be contained in the tag. Next, the system parses the tag to determine the namespace and the tag name (block 304). For example, the tag "/dynamic/sql:///vm/vendor" has namespace "/dynamic/sql:///vm" and tag name "vendor." The namespace is analyzed to determine what type of tag is being used (block 306). For example, for the namespace "/dynamic/sql:///vm," a dynamic tag needs to be resolved. Since the namespace indicates the tag is a dynamic tag, the namespace is resolved according to the protocol contained in the namespace (block 308). For example, an SQL lookup is performed by retrieving the "vendor" attribute from the currently operative database vm or vms, according to the Ruby on Rails convention, in the table relating to the virtual machine VM in question. It will be appreciated that since the namespace for virtual tags, described above, indicates the name of the database to be queried, virtual tags are merely one type of dynamic tag and therefore are a subset of dynamic tags. In the example dynamic tag namespace "/dynamic/sql:///vm," the SQL database name and lookup are explicitly contained within the tag. Systems using virtual tags are aware by virtue of the tag being virtual that a database lookup needs to be performed. Finally, the value represented by the parsed tag name is returned to the requestor for use as appropriate (block 310). For example, the value stored in the vendor field for the appropriate table vm or vms in the currently operative database is returned for use by the requestor.

It should be appreciated that in alternative embodiments, not illustrated by FIG. 3, the namespace may contain a suitable URI for many types of requests, such as LDAP directory requests such as /dynamic/ldap://server?request, web service requests such as /dynamic/ws://someURL?opts/attrname, or requests using other standard protocols such as http, ftp, https, sftp, ssh, or any other suitable protocol. In still other embodiments, the namespace may contain calls to local programs that return the appropriate tag value, such as /dynamic/localproc://myprogram?parm1+parm2, or calls to remote programs via mechanisms such as Remote Procedure Call (RPC) or other suitable remote program calls. It should be appreciated that regardless of the method used to retrieve a tag value, the namespace is critical because it is from the namespace that the system determines the method to retrieve the appropriate tag value or the context for interpreting the tag value. It should be further appreciated that no value is associated with a dynamic tag until the dynamic tag's namespace is parsed and resolved. Unlike system tags, which are stored as tag values associated with an asset, dynamic tags contain instructions for obtaining a particular tag value for a particular asset, thus enabling "late binding" or just-in-time computation of dynamic tag values.

Management tags (also known as managed tags) enable users or administrators to record business knowledge that is not readily available or discoverable. For example, the management tag/managed/department/finance might be used to represent an asset's association with the Finance Department, the management tag/managed/location/Chicago might represent an asset's association with the Chicago location, or the management tag/managed/environment/production might be used to represent an asset's association with the Production environment. Typically, management tags are assigned and entered by users or system administrators because such users or system administrators have the business knowledge to assign management tags to the appropriate assets. If the user or system administrator assigns management tags to a system, known as seeding the system with business knowledge, the system may then automatically assign management tags if it is so configured. In one example embodiment, if a physical host machine running virtual machines is tagged with the management tag/managed/environment/production, the system is configured to automatically tag all virtual machines registered to this host with the same management tag/managed/environment/production.

Similar to virtual tags and dynamic tags, management tags use a namespace to specify the type of tag (managed) and the context (environment, location, department, etc.) for interpreting the tag. In one example embodiment, the testing environment and the testing department are two distinct characteristics with which an asset may be tagged. In this example embodiment, the two characteristics are tagged with the management tags /managed/environment/test and /managed/department/test, respectively. In this example embodiment, the namespace distinguishes the two otherwise similar tags.

In other embodiments, a user with the necessary privileges or an administrator may create a set of management tags in a specific context to limit the universe of management tags from which the user who is tagging an asset or object may choose. For example, the environment context (/managed/environment) may be limited to possible management tags "development," "test," and "production" before a user or system administrator associates a tag with an asset. In other embodiments, the system may be configured to allow management tags to be associated with a predetermined number of assets. In example embodiments, an asset or object may be associated with one or zero management tags, only one management tag, zero or more management tags, or one or more management tags, within any given context.

Figure 4:
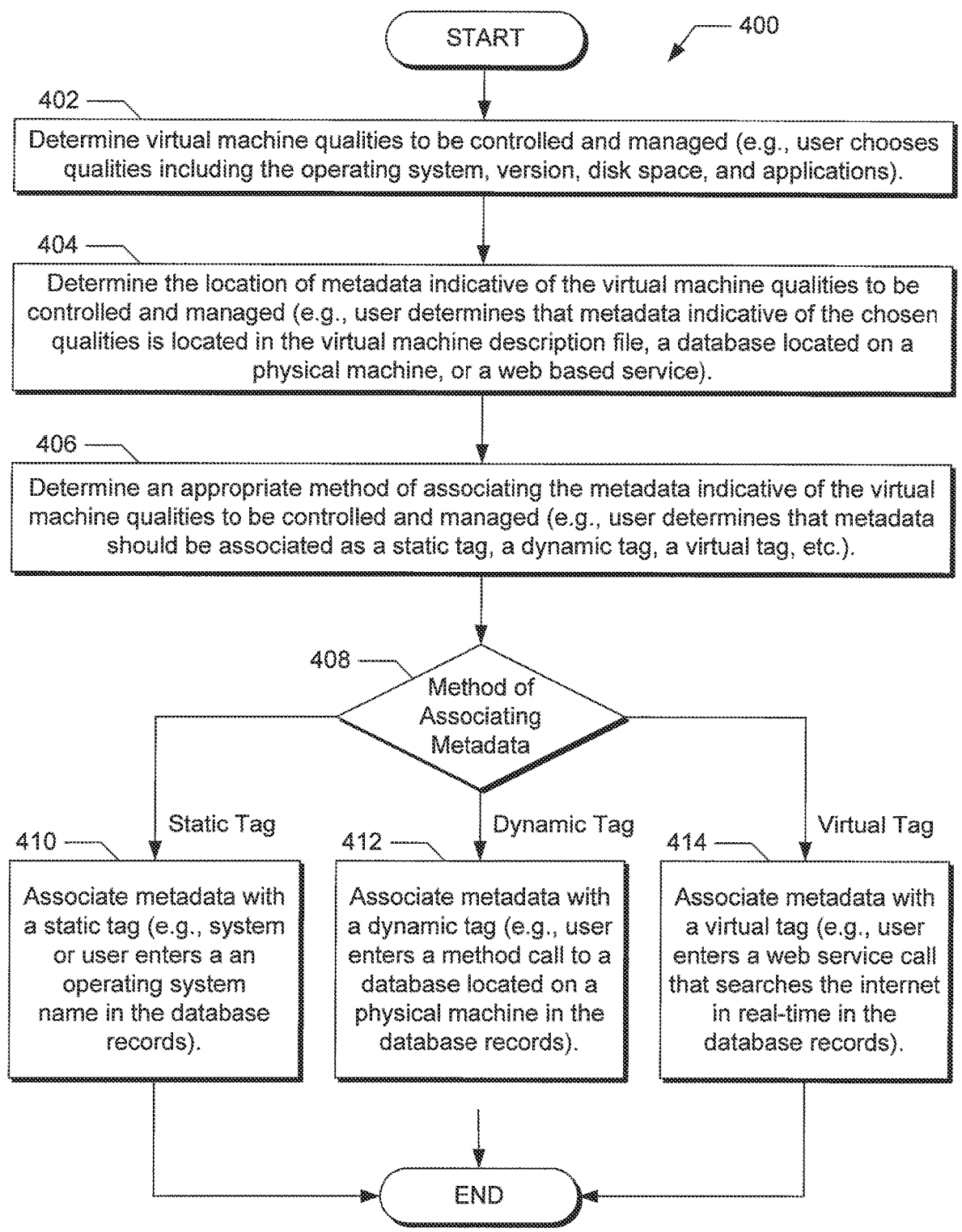
FIG. 4 is a flow chart of an example process for associating metadata for a virtual machine with a tag.

FIG. 4 is a flow chart of an example process for associating metadata about a virtual machine 100 with a tag 400, wherein the tag represents the actual metadata or a method of obtaining the metadata. Although the example process for associating metadata about a virtual machine with a tag 400 is described with reference to the flow chart illustrated in FIG. 4, it will be appreciated that many other methods of performing the acts associated with associating metadata about a virtual machine with a tag. For example, the order of many of the blocks may be changed, and many of the blocks described are optional.

The example process for associating metadata for a virtual machine 100 with a tag 400 begins when a system or user determines virtual machine qualities to be controlled and managed, indicated by block 402. For example, the system or user chooses virtual machine qualities including the operating system, version, disk space, and applications. The process then determines the location of metadata or the actual metadata indicative of the virtual machine qualities to be controlled and managed, indicated by block 404. In some embodiments, qualities to be controlled and managed are not recorded in or discoverable by any system and are only available based on the knowledge of individuals using the system (e.g. a certain physical device belongs to the Finance Department, a particular application is in Production, or some combination such as a system is physically located in Datacenter Orlando and is used in Production by the Finance Department). For example, the system or user determines that metadata indicative of the chosen qualities is located in the virtual machine description file, a database located on a physical machine, or a web based service or knows the actual metadata and enters it.

Once the location of the metadata or the actual metadata is known, the system or user determines an appropriate method of associating the metadata indicative of the virtual machine qualities to be controlled and managed, indicated by block 406. For example, the system or user determines that metadata should be associated as a static tag, a dynamic tag, a virtual tag, a management tag, etc. The method of associating the metadata is chosen by the system or user, indicated by block 408. The decision may depend on various factors including the location and accessibility of the metadata, whether the metadata might change, the importance of the metadata, etc.

The system or user may choose to associate the metadata with a static tag, indicated by block 410, a dynamic tag, indicated by block 412, a virtual tag, indicated by block 414, or some other type of tag not illustrated in this example process 400. For example, if the system or user chooses to associate the metadata with a static tag, illustrated by block 410, the system or user may enter an operating system name in database record 104 or create an association between database record 104 and the tag. In another example, if the system or user chooses to associate the metadata with a dynamic tag, illustrated by block 412, the user may enter a method reference to a database located on a physical machine in the database records 104 or associated with database records 104. In another example, if the system or user chooses to associate the metadata with a virtual tag, illustrated by block 414, the system or user may enter a web service call that searches the internet in real-time in the database records 104 or associated with database records 104. Once the metadata is associated with a virtual machine with a tag, the virtual machine may be more easily managed and controlled by using the tag. The example process for associating metadata for a virtual machine with a tag 400 may be performed whenever the system or user chooses to update the database records 104 or tags associated with database records 104.

In an alternative embodiment, a user or administrator defines a finite set of tags that may be associated with a given asset. Thus, when tags are associated with an asset in a universe of assets, the potential values of the tags are limited to the user or administrator defined finite set of tags. This embodiment may apply to any of the types of tags discussed above, including system tags, dynamic tags, virtual tags, and management tags. If a user or administrator defines a finite set of tags that may be associated with a given asset, and if those tags are dynamic tags or virtual tags, the method disclosed herein includes the additional step of checking that the values returned by the method or web access call will be compliant with the user or administrator defined finite set of potential tag values. It should be appreciated that by defining a finite set of potential tag values, the method disclosed herein ensures that systems, processes, or users viewing or otherwise utilizing the tag values will be presented with only expected tag values. Moreover, the method disclosed wherein a user defines a finite set of possible tag values ensures that assets do not have unknown or misspelled tags assigned to them. In one example embodiment, a user or administrator defines a finite set of potential tag values that can be associated with business classifications in an IT organization specific to the organization creating them. For example, a classification can be "Line of Business" and its associated values, such as Marketing, R&D, Sales, Finance, etc. In a further example, the classification could be customer and the potential values could be the names of the customers of a business organization.

It should be appreciated that for all the types of tags disclosed above, an asset that is associated with another asset may share tags with the associated assets. In various embodiments, the assets are related as parents/children of other assets, as siblings of other assets, as members of other assets, as one of a type of asset, or as other related assets. For example, if an asset is a virtual machine 100, the virtual machine 100 may generate a new virtual machine 100 that is a child of the original virtual machine 100. In the example embodiment, the child virtual machine 100 may inherit the tags contained in the database record 104 associated with the parent virtual machine 100. In one embodiment, when a tag is assigned to an asset that has a database record 104, the tag is automatically also associated with all assets that are associated with the asset.

Since tags are associated with each asset in a universe of assets, it is a further advantage of the method disclosed herein to enable a robust tag algebra. To do this, the instant disclosure indicates that tags may be connected to each other using Boolean Algebra operators. For example, tags may be connected with operators including NOT, AND, and OR. By nesting these Boolean operators, tag algebra is as robust as necessary to connect tags and enable comprehensive, customizable logical expressions. Sets of tag values, connected by Boolean operators to constitute tag algebra, can be analyzed to determine a truth-value when compared with a given database record 104 containing a set of tags. Thus a set of database records 104 can be analyzed and for each database record 104, a truth-value can be generated indicating whether the set of tags contained in or associated with the database record 104 satisfies the tag algebra expression. After applying the tag algebra expression to each database record 104, a subset of database records 104 generated from the universe of assets managed and controlled with tags that satisfies the tag algebra expression can be generated. This enables a new Tag-Based Query Language (TQL), as discussed below. Moreover, the implementation of a complex and robust tag algebra enables the implementation of tag-based access control and tag-based policies, also discussed below.

Figure 5:
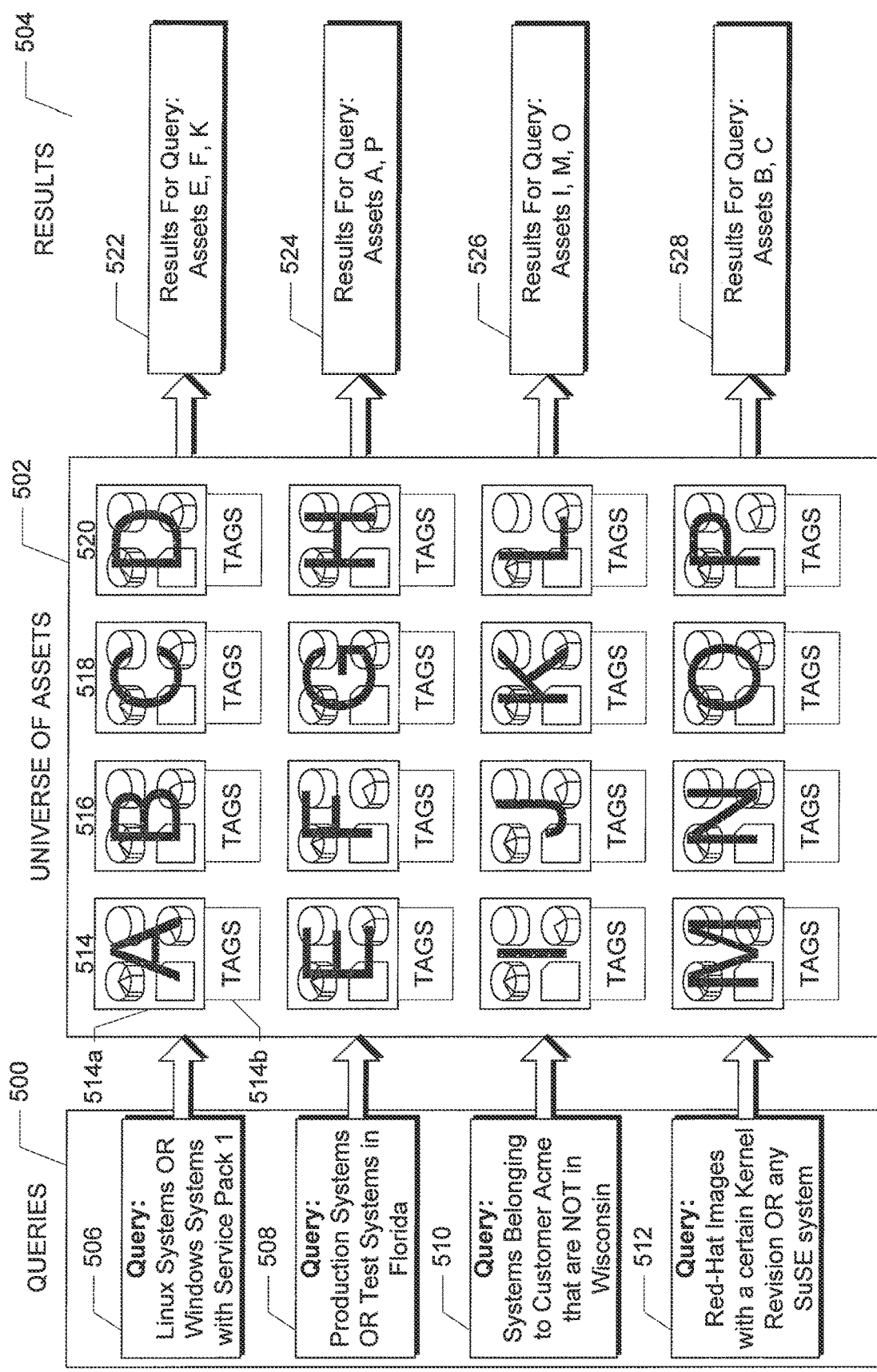
FIG. 5 is an illustration of an implementation of a Tag-Based Query Language (TQL) that allows easy searching of assets in a universe of assets.

FIG. 5 illustrates a Tag-Based Query Language (TQL), which is enabled by the method disclosed herein. Using this TQL, assets from the universe of assets can be queried based on the tag algebras discussed above. As indicated by block 500, queries can be formed in the TQL using standard Boolean operators and providing terms that are potential tags associated with any of the assets in the universe of assets 502. The results of the TQL query are in the form of lists of assets, represented by area 504. Queries 506, 508, 510, and 512 represent possible TQL queries. Each of the queries is applied to the universe of assets 502. Each of the assets, indicated by representative set of assets 514, 516, 518, and 520, includes the asset itself 514*a*, as well as the tags associated with the asset 514*b*. By applying the query and the Boolean logic to each set of tags 514*b* for each asset 514*a*, an appropriate list of matching assets 522, 524, 526, or 528 are generated. These matching assets represent the results of a TQL query 506, 508, 510, or 512, respectively. It should be appreciated that the method need not know anything about the individual assets 514*a* searched for each TQL query—rather, the method need only know the location of each database record 104/514*b* corresponding to the asset 514*a*. In one embodiment, the assets in the universe of assets 502 are all virtual machines. In another embodiment, the assets in the universe of assets 502 include one or more of virtual machines, terminals, hardware devices, physical host machines, business organizations, or any other suitable asset with which tags can be associated.

Figure 6:
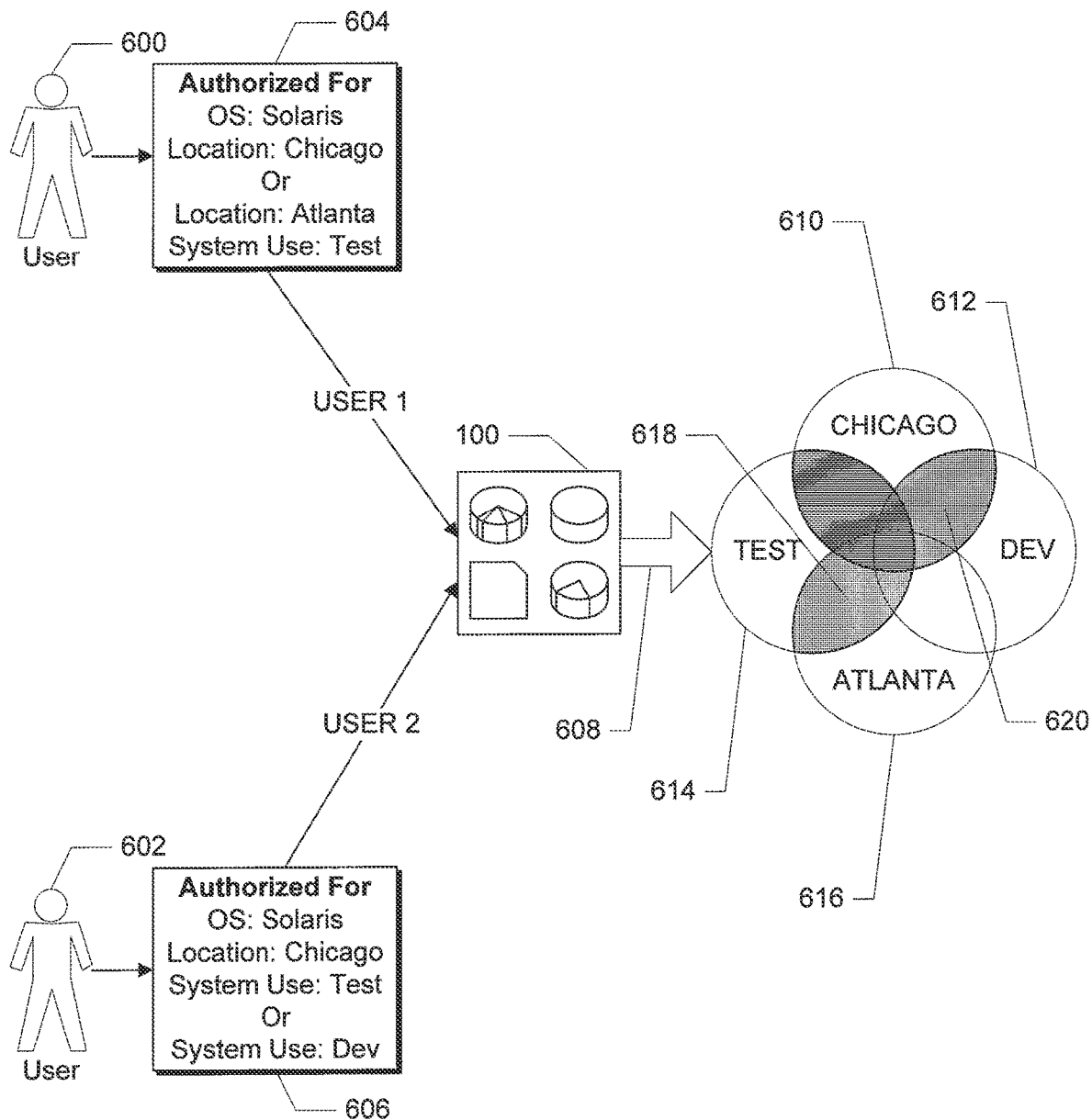
FIG. 6 is a block diagram of an implementation of an example access control protocol based on tags associated with assets and a user.

Referring now to FIG. 6, a tag-based access control is provided. In one embodiment, the tag-based algebra associated with a user defines the material the associated user may view. In other embodiments, the tag-based algebra defines what information the user may, read, create, write, update, and/or execute. In still other embodiments, the tag-based algebra is exclusionary—that is, the tag-based algebra defines the information an associated user may NOT view, read, create, write, update, and/or execute.

FIG. 6 illustrates that for each user 600 and 602, of a management system employing the various tags and tag-based algebra discussed above, a tag-based algebra 604 and 606 is associated with the user. Tag-based algebra 604 is associated with the user 600 such that the user's 600 algebra indicates the user 600 may access information containing location tags Chicago OR Atlanta AND type tag Test 604. Similarly, tag-based algebra 606, which is associated with user 602, indicates that user 602 may access information containing location tag Chicago AND type tag Test OR Dev 604. For any piece of information or data a user 600 or 602 wants to access, the virtual machine 100 interprets each user's 600 and 602 tag-based algebra and applies it to the tags of a desired piece of information, indicated by arrow 608. If the application of the tag-based algebra 604 or 606 results in a truth value of true, the virtual machine 100 provides the information or data to the user 600 or 602. For example, area 610 indicates the totality of information available to a user 600 or 602 whose tag-based algebra allows access to all Chicago-location information. Area 612 indicates the totality of information available to a user 600 or 602 whose tag-based algebra allows access to all Dev-type information. Area 614 indicates the totality of information available to a user 600 or 602 whose tag-based algebra allows access to all Atlanta-location information. Area 616 indicates the totality of information available to a user 600 or 602 whose tag-based algebra allows access to all Test-type information. As indicated by arrow 608, virtual machine 100 controls the user's 600 or 602 access to the proper subset of the totality of information represented by areas 610, 612, 614, and 616. Based on the user's 600 tag-based algebra 604, user 600 has access to the information represented by sub-area 618. This is because the user 600 can access materials relating to (Chicago OR Atlanta) AND Test. Similarly, based on the user's 602 tag-based algebra 606, user 602 has access to the information represented by sub-area 620. This is because the user 602 can access materials relating to (Test OR Dev) AND Chicago. It will be appreciated that any of the standard Boolean algebra operators, known to those of skill in the art, may be applied to any of the system, dynamic, or virtual tags contained within a user's 600 or 602 tag-based algebra 604 or 606 to grant or prevent access to any applicable subset of information.

In another example embodiment, the tags or tag-based algebra may be inherited rather than directly assigned to a user. In one such embodiment, a user is a member of department Development, which may have a management tag Test applied to it. In this embodiment, although the user does not have the Test tag applied directly to the user, the system may be configured to allow the User to inherit the tags applied to the user's department. Thus, the practical result of inheriting the management tags associated with department Development is that the user is treated the same as if the user was directly tagged with the Test management tag.

In another example embodiment, virtual machines residing at a particular storage location may similarly inherit tags from the storage location without the system explicitly associating those tags with the virtual machine. Because the virtual machine does not have tags associated directly with it, if the virtual machine is later moved to a different storage location, the virtual machine will inherit the tags associated with the new storage location.

In another embodiment, tags are used to implement a tag-based filtering system. In this embodiment, tag-based algebra expressions are associated with assets that are not users. By applying the tag-based algebra associated with an asset to the tags associated with another asset, tag-based filtering enables the system to determine whether the two assets may interact. When the combination of the tag-based algebra expression associated with one asset and a set of tags associated with another asset results in a truth value of true, the system enables the two assets to interact as necessary. In an example embodiment, in a standard Event-Condition-Action architecture, events, conditions and actions are grouped together to form a policy. The policy defines the events to which it applies, the conditions to check when a particular event occurs, the actions to take when the condition is true, and the actions to take on the condition is false. In this example embodiment, the pre-defined events, conditions, and actions are associated with an asset by the appropriate tags and representing them to the system with the appropriate tag-based algebraic expression. By applying the tag-based algebra expression to the tags of other assets, certain combinations of events, conditions, and actions are restricted when composing policies. in a further example embodiment, a Scan Event and a Scan Action may be tagged with different tags or tag algebras to disallow an endless loop of trying a scan, failing, and re-trying the scan as a result of the failure. In another example embodiment, tag-based algebra may be used to disable or substantially cripple policies containing security breaches. In still another embodiment, tag-based filtering may enable a user logged in as a SuperUser with unlimited system access to model the access available to other users in other roles, such as operator, auditor, or security administrator. The SuperUser may therefore behave as any other type of user without the need to log out of a system as SuperUser and back in as the desired user type.

Applying dynamic tags enables a system to automatically maintain and enforce a complex set of policies. Since dynamic tags enable the system to obtain appropriate data about an asset, dynamic tags are never stored or applied to the object about which data is sought. For example, though a dynamic tag may enable a system to obtain information about the vendor of virtual machine VM, the dynamic tag enabling the system to retrieve that information will never be associated with virtual machine VM. As such, one useful application of dynamic tags is to enable a system to maintain and enforce policies. Policies enable a system to ensure that particular actions are take or are not taken with respect to the assets in a universe of assets. For example, a system with both computer hardware assets and personnel assets might use dynamic tags to manage and enforce policies such as "when a user from the finance department logs into the system, send an email to the CFO" or "when a user who is an ex-employee logs in to the system, notify the security department." In this example embodiment, dynamic tags enable the system to obtain information about when certain personnel assets (e.g. a user from the Finance Department or a user who is an ex-employee) perform certain actions (e.g. log in to the system) and to respond with an appropriate system action (e.g. send an email to the CFO or notify the security department). The assets about which the dynamic tags obtain information (the personnel assets) are not associated with the personnel assets—rather, they are utilized by other processes to retrieve the necessary information.

In a further example, a tag-based policy is implemented without assigning a tag to a virtual machine. In this example embodiment, the tag that is used is a virtual tag. The example policy is defined as follows: on a StartVM, if /virtual/vm/vendor=="vmware", the REJECT request. Each time a StartVM request is made for a virtual machine VM, virtual tag "/virtual/vm/vendor" is retrieved even though none of the virtual machines VM have an associated tag "/virtual/vm/vendor." The returned value is compared with the string "vmware," and if the returned value and the string are equivalent, the StartVM request is rejected. By using virtual tags not associated with any virtual machine VM, the system in the example embodiment implements a policy ensuring that no VMware VMs are allowed to start.

A further example embodiment of how a policy is maintained and enforced involves ensuring that certain activity is prohibited among virtual machines. In this example embodiment, the dynamic tags are not associated with the virtual machines managed by the system—rather, they are utilized by other processes to retrieve the necessary information about the virtual machine assets in the system. In one example, a system contains assets including virtual machines associated with two customers. An example policy is implemented to ensure that only virtual machines for one of the two customers are running on a given host machine. In the example embodiment, each virtual machine is tagged with a system tag indicating the customer with whom the virtual machine is associated (e.g. "/managed/customer/customer1"). The appropriate policy can be enforced by using the value returned by a dynamic tag to determine whether a StartVM request should be granted (e.g. "/dynamic/host/proc: //runningVMs?taggedWith="/managed/customer/customer1"). Thus, the dynamic tag is associated with the policy, as opposed to the virtual machine itself, and is used to ensure that virtual machines from two different customers are not run on the same physical host machine.

FIG. 7 illustrates maintaining and enforcing tag-based policies based on queries made in the TQL, which is enabled by the method disclosed herein. As indicated by block 700, policy requests can be generated that enforce policies on arbitrary collections of assets. The collections of assets are determined based on the tag algebra discussed above. More specifically, policy requests enforce policies on assets that are found as the result of TQL queries. A policy request 706 that requests that all Linux systems are rebooted at 3:00 AM each Monday morning performs a TQL query on a list of assets, represented by area 704. The method described herein selects all assets that satisfy the query—that is, all assets that run a Linux operating system. For each asset in the list of assets representing the result of the TQL query, the policy is applied, represented by 704. For each policy request, a TQL query is performed on the set of assets 702 and the requested policy is enforced on the resulting assets, represented by blocks 724, 726, and 728. Each asset, indicated by representative set of assets 714, 716, 718, and 720, includes the asset itself 714a, as well as the tags associated with the asset 714b. By applying the query and the Boolean logic to each set of tags 714b for each asset 714a, an appropriate list of matching assets is generated. More specifically, for policy request 706, the policy is applied to assets D, E, F, and K, represented by block 722. Similar results occur for policy requests 708, 710, and 712. It should be appreciated that the method need not know anything about the individual assets 714a searched for each TQL query—rather, the method need only know the location of each database record 104/714b corresponding to the asset 714a. In one embodiment, the assets in the universe of assets 702 are all virtual machines. In another embodiment, the assets in the universe of assets 702 include one or more of virtual machines, terminals, hardware devices, physical host machines, business organizations, or any other suitable asset with which tags can be associated. It should be further appreciated that individual assets may be tagged with policies such that by analyzing the tags, a policy can be applied to a single asset. In this way, policies can be stored as tags to assets and the method disclosed herein can analyze each asset and run whatever policies need to be run in response to events, user requests or on a configured schedule.

In summary, persons of ordinary skill in the art will readily appreciate that methods and apparatus of tagging assets and performing queries based on the tags have been described. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method for using tags to manage virtual machines, the method comprising:
   storing a plurality of virtual machines in a first location on at least one physical host machine;
   associating a plurality of tags with the plurality of virtual machines, wherein each of the plurality of tags are associated with respective metadata representing a virtual machine characteristic, the plurality of tags including at least one of a dynamic tag and a virtual tag, the at least one of the dynamic tag and the virtual tag including a tag name and a separate and different namespace that is indicative of (i) a second location storing the respective metadata representing the virtual machine characteristic, wherein the second location is outside the plurality of virtual machines in the first location, and (ii) a call to at least one of a program and a database at the second location to obtain the respective metadata representing the virtual machine characteristic from the second location;
   parsing the at least one of the dynamic tag and the virtual tag to determine the tag name and the namespace;
   storing the plurality of tags in a third location, wherein the third location is (i) outside the plurality of virtual machines in the first location and (ii) across a network from the second location storing the respective metadata representing the virtual machine characteristic;
   parsing the namespace to obtain the second location and the call; and
   resolving the namespace with the second location and the call to obtain the respective metadata,
   wherein no value is associated with the at least one of the dynamic tag and the virtual tag until the namespace is parsed and resolved, and
   wherein the tags associated with the plurality of virtual machines allows the plurality of virtual machines to be queried using a tag-based query language, wherein the tag-based query language uses Boolean algebra.

2. The method of claim 1, wherein at least one of the plurality of the tags are associated with at least one of the plurality of virtual machines automatically.

3. The method of claim 1, wherein at least one of the plurality of tags are associated with at least one of the plurality of virtual machines based on at least one user inputted value.

4. The method of claim 1, wherein at least one of the plurality of tags are associated with at least one of the plurality of virtual machines by a user, wherein the user selects the tags to be associated with the plurality of virtual machines from a predefined set of tags.

5. The method of claim 1, wherein at least one of the plurality of tags associated with at least one of the plurality of virtual machines are virtual tags, the virtual tags containing pointers to data in a database.

6. The method of claim 1, wherein at least one of the plurality of tags associated with at least one of the plurality of virtual machines are dynamic tags, the dynamic tags referencing data via a web service call.

7. The method of claim 1, wherein at least one of the plurality of tags associated with at least one of the plurality of virtual machines are derived from an asset related to the at least one virtual machine.

8. The method of claim 1, wherein the tags associated with the plurality of virtual machines may be combined using Boolean algebra to enable a combination of tags to be applied to a set of tags to result in a truth value.

9. The method of claim 1, wherein the tags associated with the plurality of virtual machines allows access to the plurality of virtual machines to be controlled using a tag-based access control, the tag-based access control determining whether a user is authorized to access an asset based on a truth value resulting from the combination of a Boolean algebra expression and a set of tags.

10. The method of claim 1, wherein the tags associated with the plurality of virtual machines allow for management of the plurality of virtual machines using tag-based policies, wherein an enforceability of the tag-based policies is determined by a truth value resulting from the combination of a Boolean algebra expression and a set of tags associated with a virtual machine.

11. The method of claim 1, wherein each one of the plurality of virtual machines include an operating system.

12. The method of claim 1, wherein at least one virtual machine is compatible with only a single physical host machine environment.

13. The method of claim 1, wherein at least one virtual machine is compatible with at least two different physical host machine environments.

14. The method of claim 13, wherein each of the at least two different physical host machine environments runs a different operating system.

15. The method of claim 1, wherein the plurality of virtual machines include first virtual machines that run a first operating system and second virtual machines that run a second operating system, such that the plurality of virtual machines respectively run a plurality of different operating systems, and the plurality of virtual machines are run on a single physical host machine environment.

16. A method for using tags to manage assets, wherein the assets are managed by a management system, the method comprising:
   associating a plurality of tags with a plurality of assets, which are in a first location, wherein each of the plurality of tags are associated with respective metadata representing an asset characteristic, the plurality of tags including at least one of a dynamic tag and a virtual tag, the at least one of the dynamic tag and the virtual tag including a tag name and a separate and different namespace that is indicative of (i) a second location of the respective metadata representing the asset characteristic, wherein the second location is outside the plurality of assets in the first location, and (ii) a call to at least one of a program and a database at the second location to obtain the respective metadata representing the asset characteristic from the second location;
   parsing the at least one of the dynamic tag and the virtual tag to determine the tag name and the namespace;
   storing the plurality of tags in a third location, wherein the third location is (i) outside the plurality of assets in the first location and (ii) across a network from the second location of the respective metadata representing the asset characteristic;

parsing the namespace to obtain the second location and the call;

resolving the namespace with the second location and the call to obtain the respective metadata; and the management system using the plurality of tags to manage the assets, wherein no value is associated with the at least one of the dynamic tag and the virtual tag until the namespace is parsed and resolved, and wherein the tags associated with the plurality of assets allows the plurality of assets to be queried using a tag-based query language, wherein the tag-based query language uses Boolean algebra.

17. The method of claim 16, wherein at least one of the plurality of tags are automatically associated with at least one of the plurality of assets.

18. The method of claim 16, wherein at least one of the plurality of assets associated with the plurality of tags include at least one of users, hosts, storage facilities, policies, and relationships.

19. The method of claim 16, wherein at least one of the plurality of tags are stored in at least one of a database and a systems management partition.

20. A system comprising:

a memory storing a plurality of virtual machines in a first location; and a processor associating a plurality of tags with the plurality of virtual machines, wherein each of the plurality of tags are associated with respective metadata representing a virtual machine characteristic, the plurality of tags including at least one of a dynamic tag and a virtual tag, the at least one of the dynamic tag and the virtual tag including a tag name and a separate and different namespace that is indicative of (i) a second location storing the respective metadata representing the virtual machine characteristic, wherein the second location is outside the plurality of virtual machines in the first location, and (ii) a call to at least one of a program and a database at the second location to obtain the respective metadata representing the virtual machine characteristic from the second location, wherein the plurality of tags are stored in a third location that is (i) outside the plurality of virtual machines in the first location and (ii) across a network from the second location storing the respective metadata representing the virtual machine characteristic, and the processor executing to:

parse the at least one of the dynamic tag and the virtual tag to determine the tag name and the namespace;

parse the namespace to obtain the second location and the call; and resolve the namespace with the second location and the call to obtain the respective metadata, wherein no value is associated with the at least one of the dynamic tag and the virtual tag until the namespace is parsed and resolved, and wherein the tags associated with the plurality of virtual machines allows the plurality of virtual machines to be queried using a tag-based query language, wherein the tag-based query language uses Boolean algebra.

* * * * *